United States Patent [19]

Scholz

[11] Patent Number: 4,519,003
[45] Date of Patent: May 21, 1985

[54] VIDEO RECORDER INCLUDING A PLURALITY OF OPERATING ELEMENTS

[75] Inventor: Gerhard Scholz, Vienenburg, Fed. Rep. of Germany

[73] Assignee: Licentia Patent-Verwaltungs-GmbH, Frankfurt, Fed. Rep. of Germany

[21] Appl. No.: 347,447

[22] Filed: Feb. 9, 1982

[30] Foreign Application Priority Data

Feb. 11, 1981 [DE] Fed. Rep. of Germany ....... 3104843

[51] Int. Cl.³ .............................................. H04N 5/76
[52] U.S. Cl. .................................. 358/335; 360/33.1; 434/323; 434/308
[58] Field of Search ................. 358/335; 360/33.1, 32; 434/323, 308

[56] References Cited

U.S. PATENT DOCUMENTS 3,921,132 11/1975 Baldwin ............................ 360/33.1
3,947,882 3/1976 Lightner ............................... 360/15
4,206,483 6/1980 Nakamura ......................... 360/33.1
4,325,081 4/1982 Abe ..................................... 434/308

OTHER PUBLICATIONS

"Interactive Videodisc Systems for Education" by Bennion, Dec., 1975, Journal of SMPTE, vol. 84, pp. 949–953.

Primary Examiner—Alan Faber
Attorney, Agent, or Firm—Spencer & Frank

[57] ABSTRACT

A video recorder system including a video recorder having an output and a plurality of operating elements which can be operated by an operator according to a desired mode of operation as outlined in operating instructions for recording a video signal and playing back the video signals via the output. The video recorder also includes means coupled to the output for storing video and audio representations of the operating instructions and for selectively applying the representations to the output. The system additionally includes a television playback device connected to the output of the recorder for receiving and utilizing the representations, in addition to the video signals, for establishing a dialog between the operator and the video recorder for the purpose of operating, programming and monitoring said recorder.

14 Claims, 2 Drawing Figures

VIDEO RECORDER INCLUDING A PLURALITY OF OPERATING ELEMENTS

BACKGROUND OF THE INVENTION

The invention relates to a video recorder system including a video recorder in which the operating elements thereof can be operated by a person according to a desired mode of operation as outlined in the operating instructions.

In the course of time, operation and programming of a video recorder having become increasingly more difficult due to the increasing availability of equipment, particularly since, compared to earlier devices of the electronic entertainment art, many new operating functions have been added. Often a plurality of operating elements must be actuated in a certain sequence or even simultaneously. Operation and programming are thus difficult even after longer periods of practice. Although instructions regarding the correct operation of the recorder are contained in printed operating instructions, such operating instructions are very voluminous due to the multitude of possible functions, such as, for example, station programming, programming a clock, recording, playback, time lapse, slow motion, still picture playback. Generally, the necessary knowledge regarding operation must often be reacquired by renewed reading of the operating instructions. Operation of such recorders in practice is often difficult even for expert operators. The result may be, inter alia, that, for example, a desired broadcast is not recorded in the absence of the operator or an already existing recording is inadvertently erased.

SUMMARY OF THE INVENTION

It is the object of the invention to simplify the operation of a video recorder.

The above and other objects are accomplished according to the invention which provides a video recorder system including a video recorder having an output means and a plurality of operating elements which can be operated by an operator according to a desired mode of operation as outlined in operating instructions for recording a video signal and playing back the video signal via the output means. The video recorder additionally includes means coupled to the output for storing video and audio representations of the operating instructions and for selectively applying the representations to the output means. The system further includes a television playback device connected to the output of the recorder for receiving and utilizing the representations, in addition to the video signals, for establishing a dialog between the operator and the video recorder for the purpose of operating, programming and monitoring the recorder.

According to the invention, a commercially available television receiver can be utilized to optically or acoustically convey to the operator in a clear and understandable form the respectively required operating instructions. The operator can then select from the various possibilities as he desires. Thus the operator always receives guidance for the correct, applicable operation. The operating instructions are thus stored in the video recorder and cannot be lost.

The optically or acoustically displayed information can be of different types. It can be a request to the operator to do a certain thing. It can contain an acknowledgement that the performed operating function was understood and evaluated by the recorder. It can also indicate that there obviously exists an operator error and that the operator should repeat the instruction.

The invention extends to all types of operation occurring in practice. Operation can be effected via an ultrasonic or infrared remote controller or by means of a field of keys contained in the recorder which can be controlled via an LED/LCD display. The invention is of particular advantage for programming the video recorder. This programming includes station programming with station search, fine tuning, direct channel selection and storage of the tuning information. It additionally includes programming of the running mechanism and time programming, time, switch-on and switch-off programming with the running mechanism mode desired in conjunction therewith, such as, for example, recording and playback as well as forward and reverse movement and also tape cuing. The programming feature also permits corrections at any desired point on the tape.

According to a further feature of the invention certain data of the video recorder from the running mechanism or from the electronic devices, such as, for example, rpm, speed and tuning signals, can be measured and checked and the value thereof is display on the playback device. Also, a guide program can be set up to detect malfunctions and for alignment work. In this way, alignment and search for malfunctions are facilitated and possibly extensive work on the video recorder is avoided.

Moreover, the operator can feed a table of contents of his video cassette into a memory of the video recorder. The playback device then serves as monitor for the memory. Thereafter, these data can be stored in the video cassette. With such a procedure, data put in are deposited, for example, in the ancillary memory of a data/FBAS converter and are monitored on the playback device. The television picture to be watched is transmitted by this converter via the audio/video control unit to the drive unit which then records the data in the cassette. The data/FBAS converter converts digital data into a TV "FBAS" signal, which is a signal containing color, luminance blanking interval and sync-signal information.

The signals furnished by the video recorder to the playback device can contain a text, certain graphics, tables, operating symbols as well as voice and other audio signals in coded and uncoded form.

The signal can be fed by the video recorder to the playback device, e.g. a commercially available televison receiver, in the form of an FBAS signal to the so-called AG (automatic gain) jack. In this case, an LF signal is transmitted additionally for the playback of voice and audio. This signal can be generated in the video recorder in a circuit for the synthetic generation of voice signals, a so-called voice synthetizer module. Or, the signal can be fed to the antenna jack of a television receiver by means of a modulated carrier.

DESCRIPTION OF THE PREFERRED EMBODIMENT

Figure 1:
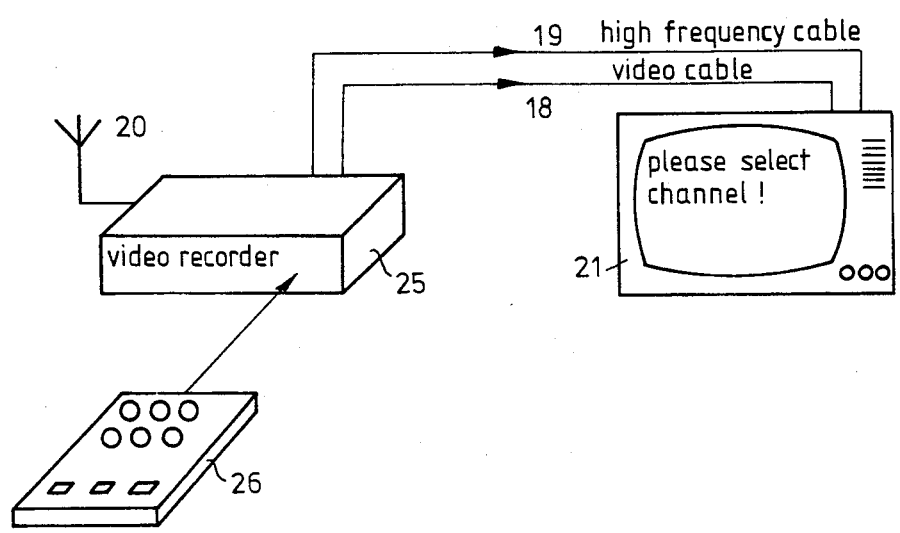
FIG. 1 is a block diagram illustrating the principle of the interconnection between the video recorder and the television receiver so as to establish dialog according to the invention.

In FIG. 1, the video recorder 25 is remotely controlled in all its functions by the remote controller 26. Through its antenna 25, the video recorder 25 is able to receive, process and record an HF television broadcast signal. During this operation, the video recorder 25 furnishes signals to the commercially available television receiver 21. These signals contain instructions and acknowledgements about the operation and are displayed on the screen and/or played through the loudspeaker. This signal transmission may be effected in the form of a carrier, which is modulated with the signals, via line 19 to the antenna jack of the television receiver 21 or in the form of an FBAS signal and an LF audio signal via line 18 to an AG jack of the television receiver 21. In the illustrated embodiment, the television receiver 21 gives the operator the instruction "please select channel". Once the channel has been selected, an acknowledgement, for example, can then be given that the channel information has been understood and evaluated and thus the receiving portion of the video recorder has been tuned to a certain channel.

A series of various functions will now be described with the aid of FIG. 2.

Processing the HF Signal

Figure 2:
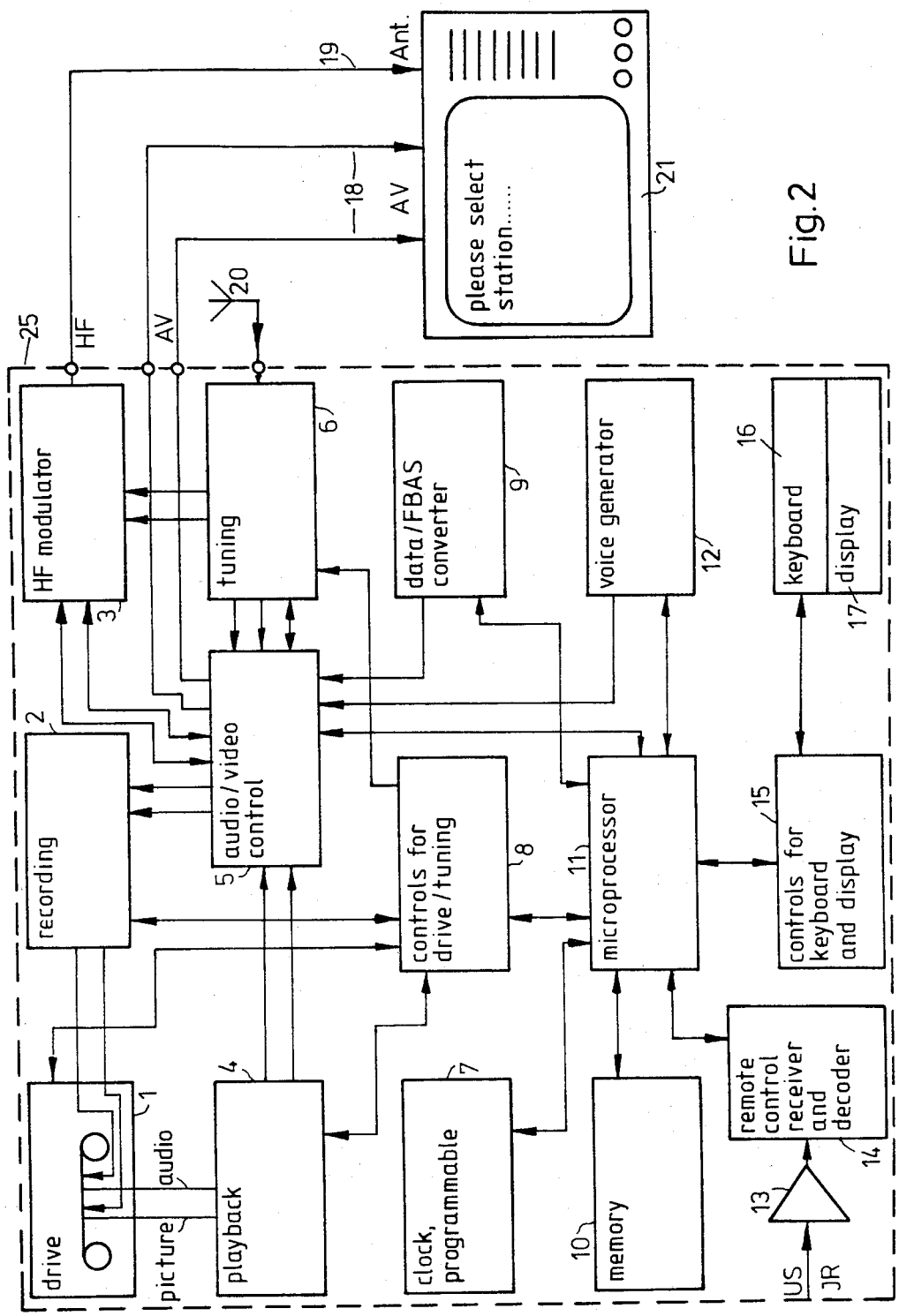
FIG. 2 is a block circuit diagram of a video recorder system according to the invention.

In FIG. 2, the HF signal received by the antenna 20 from a television station is fed to the tuning unit 6. From there it can be switched directly back to an output of the video recorder 25 and can reach, via line 19, the antenna jack of the television receiver 21. In the tuning unit 6, the received signal is decoded into video and audio signals and is recorded on videotape via the control unit 5 and the recording unit 2 including the drive unit 1. These signals can additionally be fed via the control unit 5 to the AG output of the video recorder 25 and from there via AG lines 18 to the television receiver 21. This switching through of the received signals to the television receiver 21 can also be effected without recording the signals on videotape.

The microprocessor 11 controls the data/FBAS converter 9 with data which are conducted to the control unit 5 as FBAS signal. From there, this signal can be fed to the HF modulator 3 and, via line 19, to the antenna jack of the television receiver 21. Or, the signal can be fed directly to the television receiver 21 via the AG line 18. With these functions it is possible to simultaneously record the signals via the recording unit 2 and the drive unit 1.

Voice Generation

The generation of voice signals takes place as follows. The microprocessor 11 operates the voice generator 12 with data which reach the control unit 5 as LF signals. These signals can be transmitted additionally, alone and/or together with the FBAS signal from converter 9, which is switched accordingly by the control unit 5, via the AG line 18 to the television receiver 21. Or, the data can be fed via the HF modulator 20 and line 19 to the antenna jack of the television receiver 21. In addition, the signal can be recorded on videotape via the recording unit 2 and the drive unit 1.

Playback Possibilities

The playback unit 4 receives the video and audio signals from the drive unit 1 via the control unit 5 and feeds it to the AG output and from there via the AG line 18 to the television receiver 21. The signal can also be fed to the HF modulator 3 and from there, via line 19, as a modulated carrier to the television receiver 21.

Modes of Operation

The operation of the video recorder 25 may take place via the keyboard 16 on the video recorder. Interrogation is effected via the control unit 15 for the keyboard from where data are exchanged with the microprocessor 11. The display of the actuated keys and the thus desired results takes place via the control unit 15, which is operated by the microprocessor 11, by means of a display unit 17 in LED/LCD design.

The video recorder 25 can also be operated via ultrasound (US) or infrared (IR) by means of the remote controller 26 shown in FIG. 1. These signals are received and amplified by the preamplifier 13 and are converted to digital signals in the remote controller and decoder 14. These signals are then taken over by the microprocessor 11 for further processing.

The respectively operated keys and the thus desired results are conducted by the microprocessor 11 in the form of data to the converter 9 and/or to the voice generator 12. From the outputs of these elements, the data are switched to the control unit 5 and are fed, via the AG output and line 18, to the television receiver 21. These data can additionally be recorded on videotape via the control unit 5, the recording unit 2 and the drive unit 1.

The control unit 8 serves to control recording, playback, running mechanism functions as well as the actuation of the tuning unit 6. The control unit 8 connects the microprocessor 11 with the playback unit 4, the recording unit 2 and the tuning unit 6. It serves to relieve the microprocessor 11. The microprocessor 11 gives operating instructions to the control unit 8. From there, the instructions are forwarded to the connected modules. Various signals, such as, for example, "end of tape", "cuing completed", "start of tape" and the like are transmitted by the drive unit 1 to the control unit 8 which forwards these signals to the microprocessor 11 where they are then processed further.

Programmable Clock

The programmable clock 7 for automatic switching in of functions for the drive unit 1 is operated by its own quartz as normal time. With a special circuit it is possible for it to continue running while consuming little energy if there is an interruption in the mains current. The clock 7 is programmable in time of day, date as well as switching times.

Memory

In the already described manner, the memory 10 serves to store data which may have been fed in, for example, by the remote controller 26. The memory 10 includes a memory ROM, a memory RAM as well as a nonvolatile memory EAROM. In the EAROM, the manufacturer has stored the chassis number which can be obtained when the system is in the service position and can be made visible on the playback device. During operation of the recorder 25, the microprocessor 11 counts the periods of operation and at the end of operation or when there is an interruption in the mains current this time is added to the operating time data in memory 10 to then be stored in the EAROM. In this way, misuse of the guarantee period to the debit of the manufacturer or seller can be prevented. The operating hour counter provides valuable reference for maintenance service with respect to wear and defects which may occur due to aging of the recorder.

I claim:

1. In a video recorder system including a video recorder having an output means, a plurality of functional means including a video storage means connected to the output means for recording video signals and for playing back such signals via the output means, and a plurality of operating elements which can be operated by an operator according to a desired mode of operation as outlined in operating instructions for controlling the functional means, the improvement wherein said video recorder includes instruction storage means coupled to said output means for storing video and audio representations of the operating instructions and for selectively applying the representations to said output means during operation of the video recorder, and said system further includes a television playback device connected to said output means for receiving and utilizing the representations, in addition to the video signals, for establishing a dialog between the operator and said video recorder for the purpose of operating, programming and monitoring said recorder.

2. A system according to claim 1, wherein said playback device is a commercially available television playback device.

3. A system according to claim 1, wherein said playback device is built into said recorder.

4. A system according to claim 1, wherein said recorder includes a digital data/FBAS converter.

5. A system according to claim 1, wherein said output means includes an output element and said recorder includes means coupled to said output element for modulating a carrier signal lying in the receiving range of said playback device with the representations.

6. A system according to claim 1, wherein said output means includes an output element and said recorder includes means coupled to said output element for generating an LF audio signal.

7. A system according to claim 1, wherein said output means includes an output element and said recorder includes means coupled to said output element for generating an FBAS signal.

8. A system according to claim 1, wherein said recorder includes circuit means for synthetic generation of voice signals.

9. A system according to claim 1, wherein said recorder includes a microprocessor which effects one of generation and actuation of the representations.

10. A system according to claim 9, and further including operator actuated means for putting operator selected representations into the memory.

11. A system according to claim 9, wherein said recorder includes means for recording data on video tape, and said system includes operator actuated means for recording operator selected representations on the videotape.

12. A system according to claim 1, wherein said recorder includes a memory for storing the representations.

13. A system according to claim 1, wherein said recorder includes a nonvolatile memory for storing a predetermined chassis number of the recorder and for reading out the number when said recorder is in a service position.

14. A system according to claim 1, wherein said recorder includes a nonvolatile memory, a clock and a microprocessor means coupled to said clock and memory for monitoring a continuous count of the hours of operation of said recorder and storing said count in said memory.

* * * * *